Sept. 17, 1946.    R. K. McDOUGAL    2,407,759
FISHHOOK
Filed Jan. 25, 1944

Inventor
ROYDEN K. McDOUGAL

By Clarence A. O'Brien
and Harvey B. Jacobson
Attorneys

Patented Sept. 17, 1946

2,407,759

UNITED STATES PATENT OFFICE 2,407,759

FISHHOOK

Royden K. McDougal, San Pedro, Calif.

Application January 25, 1944, Serial No. 519,629

1 Claim. (Cl. 43—40)

The present invention relates to new and useful improvements in fish hooks for use particularly with live minnows, sardines, et cetera, and has for one of its important objects to provide, in a manner as hereinafter set forth, a device of this character comprising novel means for firmly retaining the bait without injuring same.

Another important object of the invention is to provide a fish hook of the aforementioned character comprising a unique construction and arrangement whereby the barbed end of the hook will lie closely adjacent one side of the tail portion of the bait to be taken into the mouth of the fish when it strikes.

Other objects of the invention are to provide a fish hook of the character described which will be comparatively simple in construction, strong, durable, reliable and which may be manufactured at low cost.

All of the foregoing, and still further objects and advantages of the invention will become apparent from a study of the following specification, taken in connection with the accompanying drawing wherein like characters of reference designate corresponding parts throughout the several views, and wherein.

Figure 1:
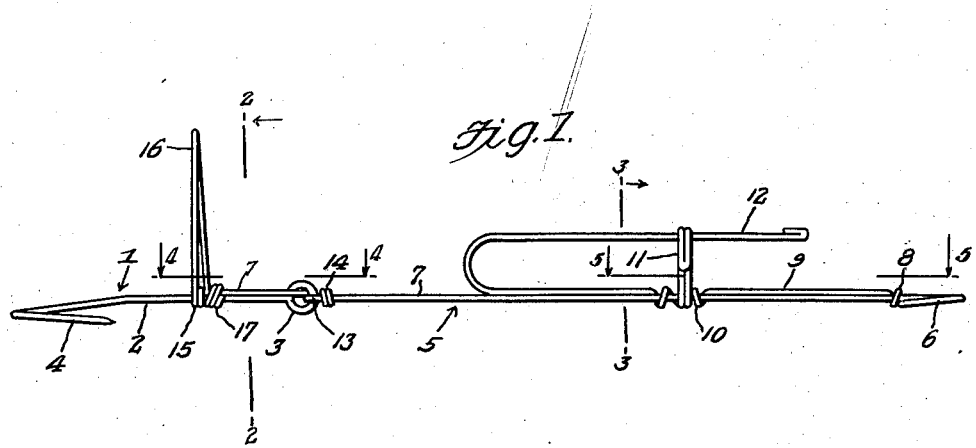
Figure 1 is a plan view of a fish hook constructed in accordance with the present invention.
Figure 2:
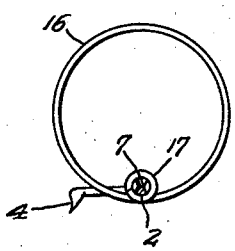
Figure 2 is a cross sectional view, taken substantially on the line 2—2 of Figure 1.
Figure 4:
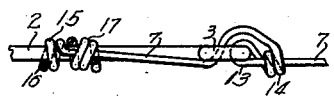
Figure 4 is a sectional view taken substantially along the line 4—4 of Figure 1 as viewed in the direction as indicated by the arrows.
Figures 3, 5:
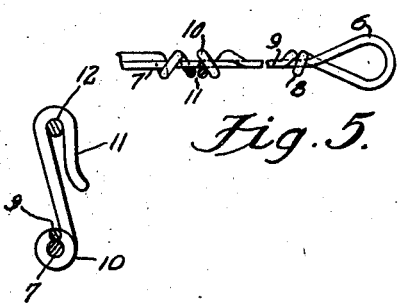
Figure 3 is a cross sectional view taken substantially on the line 3—3 of Figure 1.
Figure 5 is a sectional view taken substantially along the line 5—5 of Figure 1 as viewed in the direction indicated by the arrows, portions thereof being broken away.

Referring now to the drawing in detail, it will be seen that reference character 1 designates generally a fish hook of suitable size and metal, said fish hook including a shank 2 having an eye 3 on one end. On the other end of the shank 2 is a hook 4.

The fish hook 1 is firmly secured on one end portion of a live bait holder 5 in a manner to project longitudinally therefrom. The live bait holder 5 is formed from a single length of suitable resilient wire which is bent at an intermediate point in a manner to provide, on the rear end of said holder, a loop 6 to which a fishing line (not shown) is to be connected.

Extending from one end of the loop 6 is a shaft 7. The other end portion of the loop 6 is wrapped around the shaft 7 at 8 and merges into a rod 9 which extends longitudinally along said shaft to an intermediate point thereon. At an intermediate point the rod 9 is wrapped around the shaft 7, as at 10, and formed to provide a keeper 11 in the form of a hook. The rod 9 terminates in a reversely bent pin 12 which is insertible through a gill and the mouth of the bait and engageable in the keeper 11.

Adjacent its forward end, the shaft 7 is looped at 13 through the eye 3 and wrapped on itself, as at 14. From the wrap 14, the shaft 7 is passed in the opposite direction back through the eye 3 and substantially parallels the shank 2 of the hook 1 to an intermediate point on said shank. At this point the shank 7 is wrapped around the shank 2, as at 15, and formed to provide a right angularly extending loop 16 through which the bait is inserted. One end portion of the loop 16 is wrapped at 17 around the shank 2 and the adjacent portion of the shaft 7.

It is thought that the manner in which the device is used will be readily apparent from a consideration of the foregoing. Briefly, the bait is inserted in the loop 16 and the pin 12 is inserted through one of the gills and the mouth of said bait. The pin 12 is then engaged in the keeper 11 and it will thus be seen that the bait is held firmly, but without danger of injury, on the holder 5. The construction and arrangement is such that the fish hook 1 projects longitudinally from one end of the holder 5. Thus, the hook 4 will be caused to lie closely adjacent one side of the tail portion of the bait to be taken into the mouth of the fish when it attacks.

It is believed that the many advantages of a fish hook constructed in accordance with the present invention will be readily understood, and although a preferred embodiment of the device is as illustrated and described, it is to be understood that changes in the details of construction may be resorted to which will fall within the scope of the invention as claimed.

What is claimed is:

A fish hook of the character described comprising a live bait holder formed from a single length of resilient wire and including a loop for connection with a fishing line, a shaft extending from one end of the loop, a rod on the other end of the loop extending longitudinally on the shaft to an intermediate point, said rod being wrapped around the shaft at an intermediate point and formed to provide a keeper, said rod terminating in a reversed free end portion insertable through a gill and the mouth of a bait and engageable in the keeper, a hook on one end of the shaft and projecting longitudinally therefrom, and a loop on said one end of the shaft projecting at substantially right angles to the hook, the last-named loop being for the reception of the bait and constituting means for retaining the hook adjacent one side of the tail portion thereof.

ROYDEN K. McDOUGAL.